US005660260A

United States Patent [19]

Bareiss

[11] Patent Number: 5,660,260

[45] Date of Patent: Aug. 26, 1997

[54] FOLDABLE CHUTE WITH PERSONNEL PROTECTION FEATURE

[76] Inventor: Raymond E. Bareiss, 1033 Stillman, Eugene, Oreg. 97404

[21] Appl. No.: 676,065

[22] Filed: Jul. 5, 1996

[51] Int. Cl.[6] .................... B65G 11/00

[52] U.S. Cl. .................... 193/10; 193/5; 193/2 A; 193/6

[58] Field of Search .................... 193/4, 5, 10, 15, 193/22, 2 A, 6

[56] References Cited

U.S. PATENT DOCUMENTS

| | | | |
|---|---|---|---|
| 1,946,222 | 2/1934 | Mandt | 193/10 |
| 2,488,292 | 11/1949 | Hilkemeier | 193/22 X |
| 3,053,367 | 9/1962 | Lynch | 193/10 |
| 3,542,179 | 11/1970 | Psichard | 193/10 X |
| 4,919,249 | 4/1990 | Alexander | 193/6 |

FOREIGN PATENT DOCUMENTS

| | | | |
|---|---|---|---|
| 0731010 | 6/1955 | United Kingdom | 193/2 A |

*Primary Examiner*—James R. Bidwell

*Attorney, Agent, or Firm*—William Freedman

[57] ABSTRACT

This chute comprises a first section and a second section having its inner end portion pivotally connected to the outer end portion of the first section in a manner that allows the second section to be pivoted from a folded position into a position of alignment with the first section. A releasable interference device blocks the second chute section from entering into its position of alignment when the second section is pivoted from its folded position into an intermediate position near its position of alignment. This interference device comprises a blocking member pivotally mounted on the inner end portion of the second chute section and comprising an impact head that is normally positioned in a blocking position between the inner end portion of the second chute section and the outer end portion of the first chute section when the second chute section enters its intermediate position. A spring biases the impact head into its blocking position. Releasing force applied to the blocking member moves the impact head out of its blocking position, and this allows the second chute section to pivot out of its intermediate position and into its position of alignment with the first chute section.

11 Claims, 4 Drawing Sheets

FOLDABLE CHUTE WITH PERSONNEL PROTECTION FEATURE

TECHNICAL FIELD

This invention relates to a chute for conveying material between two points and, more particularly, relates to a chute of this type that comprises a plurality of sections, one of which is pivotally connected to another and can be moved from a folded position into a position of alignment with the other.

BACKGROUND

A typical application for such chutes is on a transit concrete mixer, in which such a chute is utilized for distributing still-soft concrete from the mixer drum to a place where the concrete is to be poured. The chute, comprising an outer section and an inner section, is stored on the transit mixer in a folded condition, i.e., with the outer section folded on the inner section. When it is desired to convey concrete from the mixer drum to another location, the outer section of the chute is unfolded into a position of alignment with the inner section, thus providing a chute with aligned sections down which the concrete can be conveyed.

Unfolding of the chute is typically carried out by one or more workers standing near the outer end of the inner chute section, one of whom swings the outer section of the chute about the pivot joint connecting the two sections, allowing the outer section to fall into its position of alignment with the inner section once the outer section passes through an intermediate position near its position of alignment with the inner section. A type of accident that sometimes occurs during this unfolding operation is that one of the workers inadvertently allows his or her hands or fingers to be in an unsafe position when the outer section is passing through its intermediate position into its position of alignment. There is a pinch point region between the adjacent ends of the two sections that is rapidly closed when the outer section passes through its intermediate position, and if the worker's hand or fingers are then within this pinch point region, they could be seriously injured by the falling outer section of the chute, which is quite heavy.

OBJECTS

An object of my invention is to reduce the chances for injury to the worker should his or her hands or fingers be inadvertently located within the above-described pinch point region during an unfolding operation.

Another object is to provide the chute with a safety device that accomplishes the preceding object and is capable of being operated from a safe location remote from the pinch point region to allow the outer chute section to fall into its position of alignment with the inner section.

Still another object is to provide a safety device of the above type which, though inactive when the chute sections are aligned, automatically resets to an active, safety-providing state when the outer section of the chute is moved a short distance out of its aligned position toward a folded position.

SUMMARY

In carrying out the invention in one form, I provide a chute comprising a first section having an outer end portion, a second section having an inner end portion, and means pivotally connecting the inner end portion of the second section to the outer end portion of the first section in a manner that allows the second section to be pivoted from a folded position with respect to the first section into a position of alignment with the first section. Releasable interference means is provided for blocking the second chute section from entering into said position of alignment when the second section is pivoted from its folded position into an intermediate position near said position of alignment. This interference means comprises a blocking member pivotally mounted on said inner end portion of the second chute section and comprising an impact head that is normally positioned in a blocking position between the inner end portion of the second chute section and the outer end portion of the first chute section when the second chute section enters said intermediate position. Spring means biases the impact head into said blocking position. The blocking member further comprises an actuating portion through which releasing force can be applied to said blocking member to move the impact head out of said blocking position. This movement of the impact head allows the second chute section to pivot into its position of alignment with said first chute section.

BRIEF DESCRIPTION OF DRAWINGS

For a better understanding of the invention, reference may be had to the following detailed description of several embodiments of the invention and to the accompanying drawings, in which.

DETAILED DESCRIPTION OF EMBODIMENTS

Figure 1:
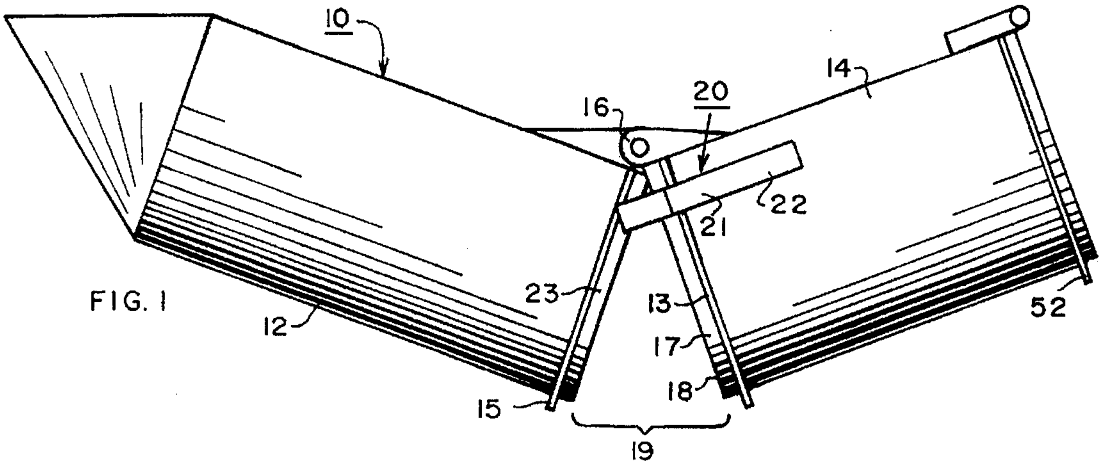
FIG. 1 is a side elevational view of a foldable chute embodying one form of the invention. The chute comprises a main section and a flop section and is shown in FIG. 1 in a partially unfolded condition with the flop section in an intermediate position.
Figure 2:
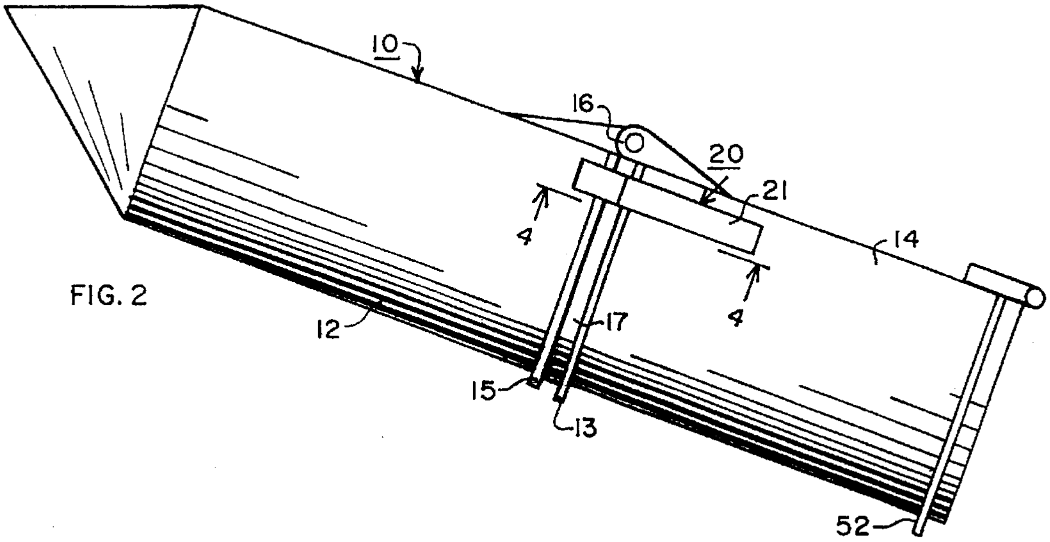
FIG. 2 is a side elevational view showing the chute of FIG. 1 in a fully-unfolded condition with the flop section aligned with the main section.
Figure 3:
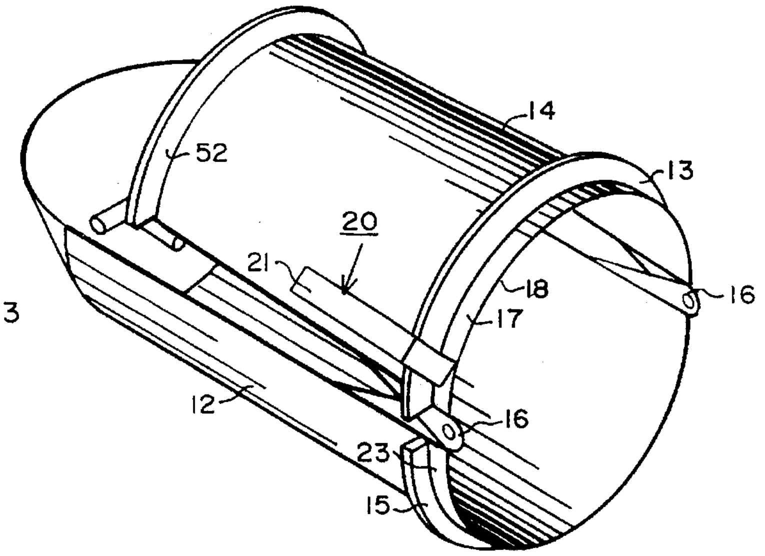
FIG. 3 is a perspective view of the chute of FIG. 1 showing the chute in a fully-folded condition.

Referring now to FIGS. 1, 2, and 3, there is shown a distribution chute 10 of a type that is used on transit concrete mixers for conveying a soft concrete mixture from a mixing drum (not shown) to a location where the concrete mixture is to be poured. Referring to FIG. 2, which shows the chute in its fully assembled condition, the concrete mixture enters the chute from the mixing drum at the left-hand end of the chute, slides down the chute, and then exits the chute at its right-hand end.

The chute of FIGS. 1–3 comprises two sections, one a main section 12 and the other a flop section 14. As shown in FIG. 3, each of these chute sections has a body of U-shaped transverse cross-section. Near the outer end of the main section 12 there is a reinforcing flange 15 welded to the body of the main section and extending about the exterior of the main section. Near the inner end of the flop section 14 there is a similar reinforcing flange 13 that extends about the exterior of the flop section and is welded to the body of the chute. When the chute is in its fully assembled, or unfolded, condition of FIG. 2, a lip 17 on the inner end of the flop section telescopes over a similarly-shaped, but slightly smaller, lip 23 on the outer end of the main section 12.

The flop section 14 is coupled to the main section 12 by two pivot Joints 16 respectively located at diametrically-opposed sides of each chute section. The chute is normally stored in a fully folded condition such as depicted in FIG. 3. When it is desired to use the chute for conveying the concrete mixture, the flop section 14 is usually unfolded (or swung clockwise about pivot joints 16) from its position of FIG. 3 into its position of FIG. 2, where it is in alignment with the main section 12.

In swinging about pivot joints 16 and moving into its aligned position of FIG. 2, the flop section 14 passes through an intermediate position illustrated in FIG. 1. Should a worker inadvertently allow his or her fingers or hand to be on the extreme outer end of the main chute section 12 when the flop section 14 is close to its aligned position of FIG. 2, serious injury could result to those fingers or hand. The flop section 14 is relatively heavy and if allowed to fall freely into its aligned position, its leading edge 18 could do serious damage to any body part in its way. Because of the possibility of such accidents, the region shown at 19 in FIG. 1 is referred to herein as a pinch point region.

For reducing the possibilities of such an accident, I provide releasable interference means 20 that is normally effective to block movement of the flop section 14 of the chute past its intermediate position of FIG. 1 when the flop section is being pivoted toward its aligned position of FIG. 2. This releasable interference means 20 comprises a blocking member 21 that is pivotally mounted on the exterior of the flop section 14 in a position near the inner end of the flop section. Referring to FIGS. 5–9, the blocking member 21 comprises a lever 22 and an impact head 24 on one end of the lever 22. The lever 22 extends generally axially of the flop section 14, and the impact head extends from the lever generally radially inward of the flop section 14. At opposite sides of the lever 22 are two tabs 27 integral with the lever 22. Extending transversely of the lever between these two tabs is a pivot pin 26 suitably secured to the tabs. The pivot pin 26 is supported by a lug 28 located between the tabs 27, fixed to the flop section 14, and containing a hole forming a bearing in which the pivot pin 26 is rotatably mounted. A torsion spring 29 encircles the pivot pin 26 and biases the lever 22 in a counterclockwise direction (FIG. 8) about the axis of the pivot pin, thus urging the impact head 24 radially inward with respect to the flop section of the chute. One end of the torsion spring bears against the lug 28 and the other end bears against the lever 22.

When the flop section 14 of the chute enters its position of FIG. 1 when it is being pivoted in a clockwise direction from its folded position of FIG. 3 toward its aligned position of FIG. 2, the impact head 24 is positioned by spring 29 between the opposing flanges 15 and 13 of the two chute sections 12 and 14 and thus blocks further movement of the flop section beyond its intermediate position of FIG. 1. In order to move the flop section 14 beyond its intermediate position of FIG.1 into its aligned position of FIG. 2, it is necessary for the worker first to force the lever 22 counterclockwise (as viewed in FIG. 5)about the axis of its pivot pin 26, thereby withdrawing the impact head 24 from its blocking position between the flanges 15 and 13 of the two chute sections 12 and 14. The worker does this simply by applying a radially-inwardly-directed force to the outer end of the lever 22, thus withdrawing the impact head 24 against the opposing bias of the torsion spring 29. The flop section 14 then falls by gravity into its aligned position of FIG. 2.

Should a worker inadvertently allow his or her hands or fingers to be located in the pinch point region 19 when the chute is being unfolded, the interference means 20 will protect these body parts from injury by blocking the flop section from pivoting beyond the intermediate position of FIG. 1. To complete the unfolding operation, the worker must first release the interference means 20, as above described, and this prerequisite operation should forcibly remind the worker of the need to keep the pinch point region clear while the unfolding operation is being completed. Referring to FIG. 1, the interference means 20 is operated by applying force to the right-hand end of lever 22, and since this right-hand end is relatively remote from the pinch point 19, there is no significant chance that the worker's fingers or hand will then be in a position of danger within the pinch point region 19.

Figure 9:
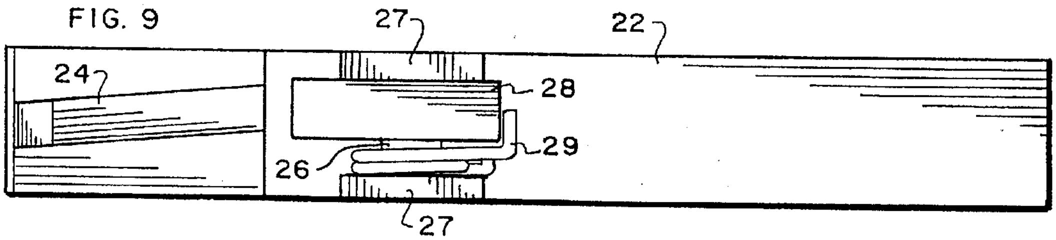
FIG. 9 is a bottom view of the device of FIG. 8.
Figure 9A:
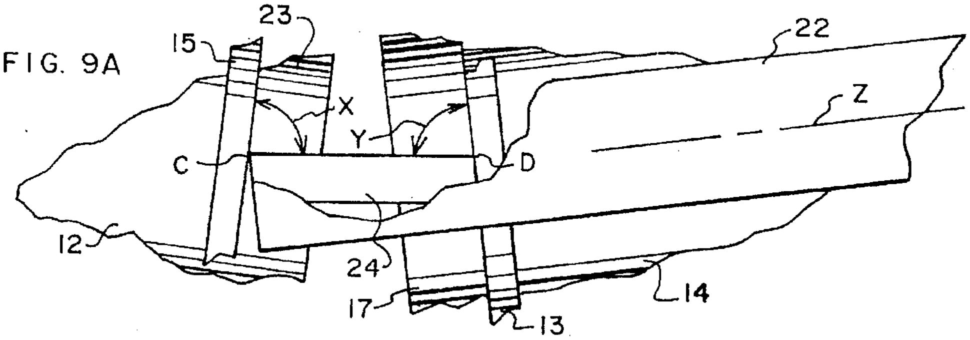
FIG. 9*a* is a top view of the interference means of FIGS. 4–9 with a portion broken away to show in more detail how the impact head 24 of the interference means blocks further unfolding of the flop section (14) when the flop section enters its position of FIG. 1.

To prevent the lever 22 from experiencing sideward torque when the impact head 24 is impacted by the flanges 15 and 13 when the flop section 14 enters its position of FIGS. 1 and 9*a* during the unfolding operation, the impact head 24 is disposed at an angle with respect to the lever 22. More specifically, referring to FIG. 9*a*, the angle x between the outer face of flange 15 and the side of the impact head when the impact head contacts flange 15 is made substantially equal to the angle y between the outer face of the flange 13 and the side of the impact head when the impact head contacts flange 13. This relationship reduces the sidewards torque imposed on the lever 22 when the impact head is impacted by the flanges 15 and 13, thus reducing wear on the mounting tabs 27, the torsion spring 29, and the pivot pin 26. The term sidewards torque, as used in this paragraph, refers to forces tending to angularly displace the normal plane Z in which the pivotally-mounted blocking member operates. The angles x and y are measured at the contact points C and D where abutment occurs between the impact head and the abutting surfaces of the flanges 15 and 13 when flop section 14 enters the intermediate position depicted in FIG. 9*a* during an unfolding operation.

Figure 4:
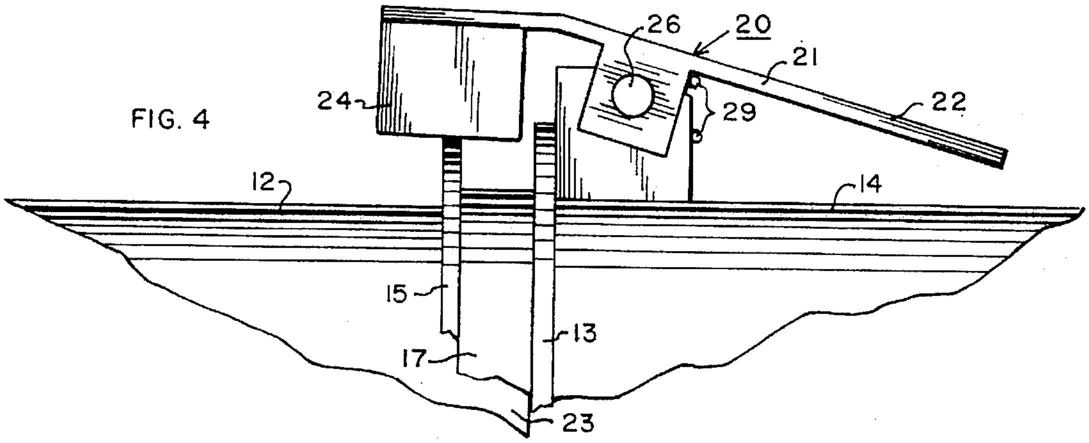
FIG. 4 is an enlarged view, partially schematic, taken along the line 4—4 of FIG. 2 and showing interference means forming a part of the chute.
Figure 5:
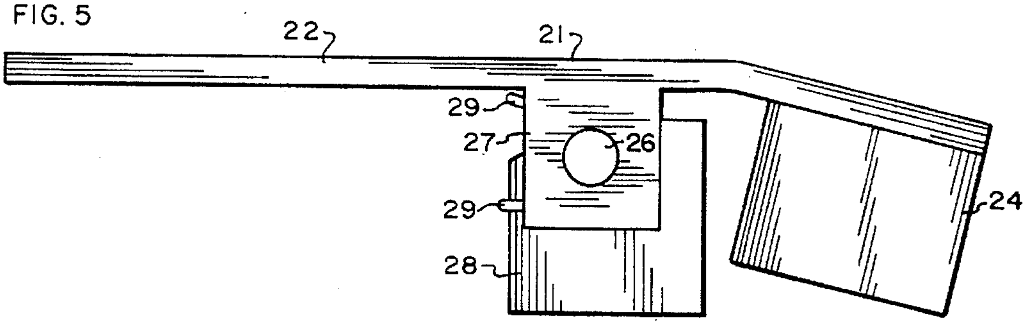
FIG. 5 is a detailed side view of a portion of the interference means showing its left-hand side.
Figure 6:
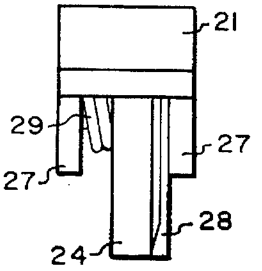
FIG. 6 is an end view of the device of FIG. 5 as viewed from its right-hand end.
Figure 7:
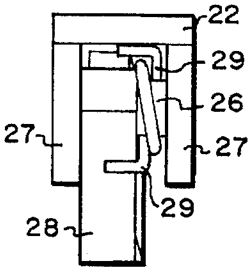
FIG. 7 is an end view of the device of FIG. 5 as viewed from its left-hand end.
Figure 8:
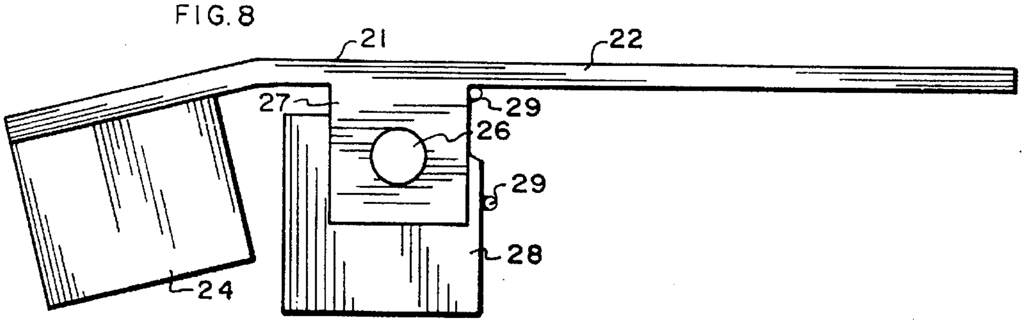
FIG. 8 is a side view of the device of FIG. 5 as viewed from its left-hand side.

When the flop section 14 of the chute reaches its aligned position of FIG. 2 with respect to the main section 12, the parts of the interference means 20 are in their disabled positions shown in FIG. 4. The impact head 24 then rests on the outer periphery of the flange 15 of the main chute section 12. When it is desired to fold the flop section 14 from its position of FIGS. 2 and 4 back toward its fully folded position of FIG. 3, the flop section is swung counterclockwise about the pivot joints 16. Referring to FIG. 4, during the initial portion of this folding motion, the impact head 24 slides axially of the chute along the outer periphery of the flange 15; but after a small amount of such unfolding motion, the interference means 20 automatically resets. More specifically, the impact head 24 is driven by the torsion spring 29 back into the space between the flanges 15 and 13. Thus, if the flop section 14 should at any time thereafter during the folding operation be allowed to fall back toward its aligned position with respect to the main section 12, the interference means 20 would then be ready to block a complete return of the flop section 14 to its aligned position. By thus resetting after only a very small amount of folding motion of the flop section, the interference means 20 can quickly resume its protective function and protect any hands or fingers which might then be located in the pinch point region 19.

Figure 10:
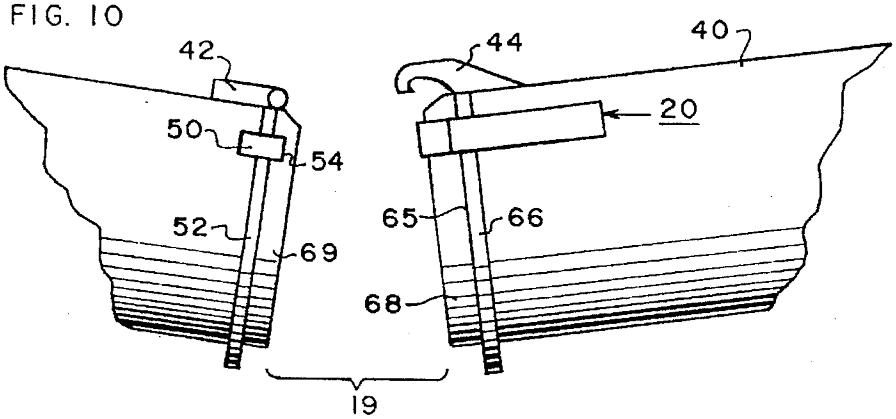
FIG. 10 is a side view of the outer end portion of the flop section of the chute and the inner end of an extension section that is adapted to hook onto the flop section.

It is sometimes necessary to employ an extension section for lengthening the chute beyond the outer end of the flop section. FIG. 10 shows such an extension section at 40 as it is being hooked onto the flop section 14. The flop section 14 is provided at the top of its outer end with radially-outwardly extending dowels 42, and the extension section is provided with hooks 44 at the top of its inner end that are adapted to hook onto these dowels. After the hooks 44 are hooked onto the dowels, the extension section 40 is pivoted counterclockwise about the dowels from a still-folded position into a position of alignment with the flop section 14. Interference means 20 corresponding to that described hereinabove is provided at one side of the extension section 40 to provide protection for the fingers and hands of a worker who might inadvertently allow them to be located in the pinch point region 19 when the extension section 40 is pivoted toward its aligned position with the flop section 14.

The hooks 44 of FIG. 10 do not protrude a substantial distance axially beyond the inner end of the extension section 40, and this is desirable in that it allows the extension section to be stood nearly flat on its inner end when not in use. It is desirable that the presence of the interference means 20 should not interfere with this relationship. In other words, the interference means 20 should also not protrude a substantial distance axially beyond the inner end of the extension section 40. To enable the interference means to function in the general manner described hereinabove even though not protruding a substantial distance beyond the inner end of the chute section on which it is mounted, I modify the mating chute section (14) in the manner shown in more detail in FIG. 11. More specifically, I attach to the exterior of the chute section 14 an auxiliary stop 50 of L-shaped cross-section which has an arm 51 projecting into a position beyond the outer face of the reinforcing flange 52 on the chute section 14. The impact head 24 on the interference means 20 impacts against the end surface 54 of this stop when the extension section 40 of the chute enters its intermediate position of FIG. 11 when being pivoted toward its position of alignment with the flop section of the chute. Thus, the extension section 40 is blocked from further unfolding movement until the interference means is deliberately released, thereby protecting the worker from injury should he or she inadvertently have allowed his or her hands or fingers to be in the pinch point region 19 just prior to this time.

Figure 11:
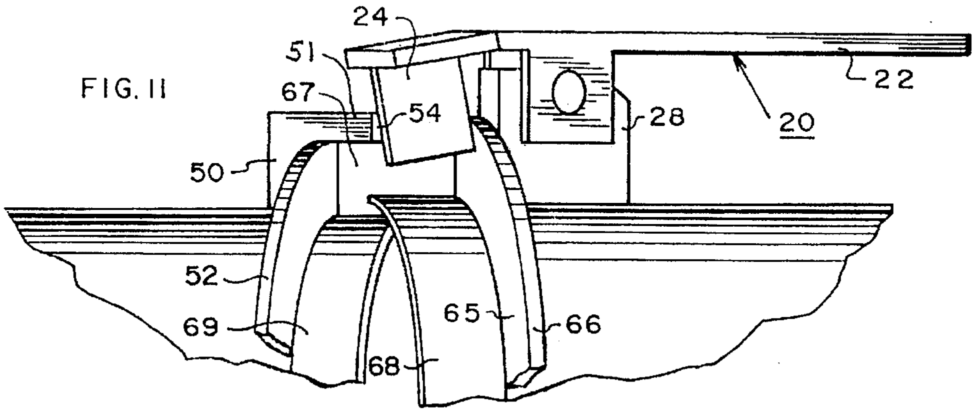
FIG. 11 is perspective view showing interference means present in the chute components of FIG. 10 after the extension section has been hooked onto the flop section and unfolded into its intermediate position. The interference means of FIG. 11 is shown blocking complete unfolding of the extension section.

Release of the interference means 20 is effected in the same manner in the embodiment of FIGS. 10–11 as in the embodiment of FIG. 1–9. In both cases, the worker simply presses on the back end of the lever 22 to lift the impact head against the opposing bias of a spring. In the embodiment of FIGS. 10–11, the impact head 24 is shorter than in the embodiment of FIGS. 1–9 so as to allow it to fit into the reduced space that is available between the surface 54 of the stop 50 and the inner end surface 65 of the reinforcing flange 66 on the extension section of the chute.

When the extension section 40 is in its fully aligned position (not shown) with the flop section 14, a lip 68 on the inner end of the extension section telescopes over a lip 69 on the outer end of the flop section. The L-shaped configuration of the stop 50 leaves a space, or recess, 67 exterior to the lip 69 into which the lip 68 can readily fit as it telescopes over lip 69. Thus, the L-shaped configuration of the stop 50 allows the active stop surface 54 to be appropriately positioned without interfering with the desired telescoping relationship of the lips 68 and 69 on the mating chute sections.

Certain chutes will not include a reinforcing flange on the outer end of the flop section. In these chutes a stop of the same general configuration as the L-shaped stop of FIG. 11 can be used in the same manner as the stop of FIG. 11 to provide the impact surface 54 and the recess 67 beneath it, as in FIG. 11.

Figure 12:
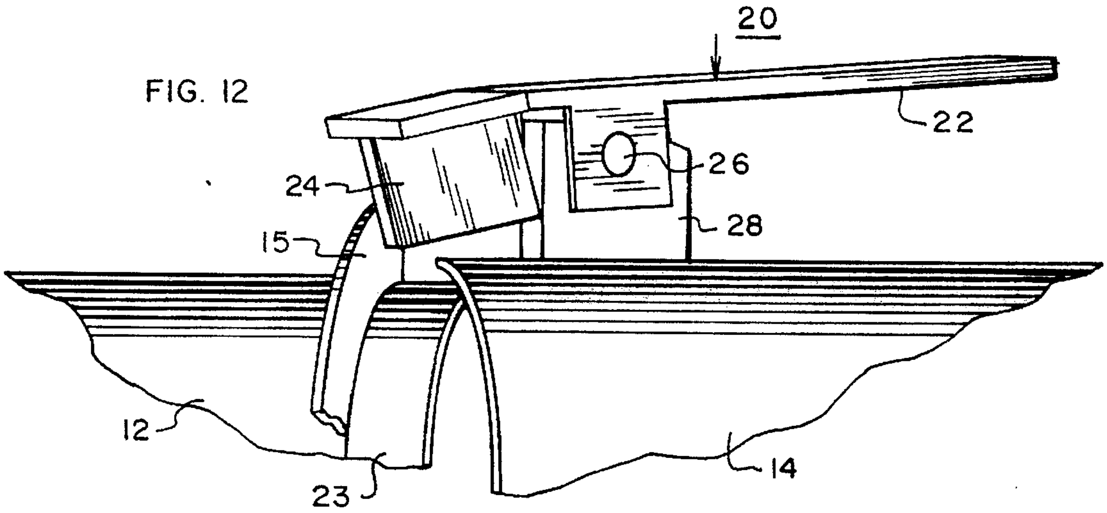
FIG. 12 is perspective view of a portion of another modified chute showing the chute components as the flop chute section enters its intermediate position during an unfolding operation. The interference means of FIG. 12 is shown blocking complete unfolding of the flop chute section.

Certain chutes will not include a reinforcing flange on the inner end of the flop Section. FIG. 12 illustrates a chute of this type comprising a main chute section 12 and a flop chute section 14 pivotally coupled to the main chute section. The main chute section of FIG. 12 is of the same construction as the main chute section 12 of the embodiment of FIGS. 1–4. The flop chute section of FIG. 12 corresponds to the flop chute section 14 of FIGS. 1–4 except that the reinforcing flange 13 is omitted in the FIG. 12 version. Interference means 20 of FIG. 12 corresponds to the interference means 20 of FIGS. 1–4 except that in the FIG. 12 version the impact head 24 of the interference means is located and shaped so that it is positioned between flange 15 and the lug 28 when the flop section enters its intermediate position depicted in FIG. 12. Thus, the impact head 24 abuts flange 15 and lug 28 when the flop section 14 enters its intermediate position upon approaching its aligned position with respect to the main chute section 12. Flange 15 and lug 28 may be thought of as stops on their respective chute sections.

Figure 13:
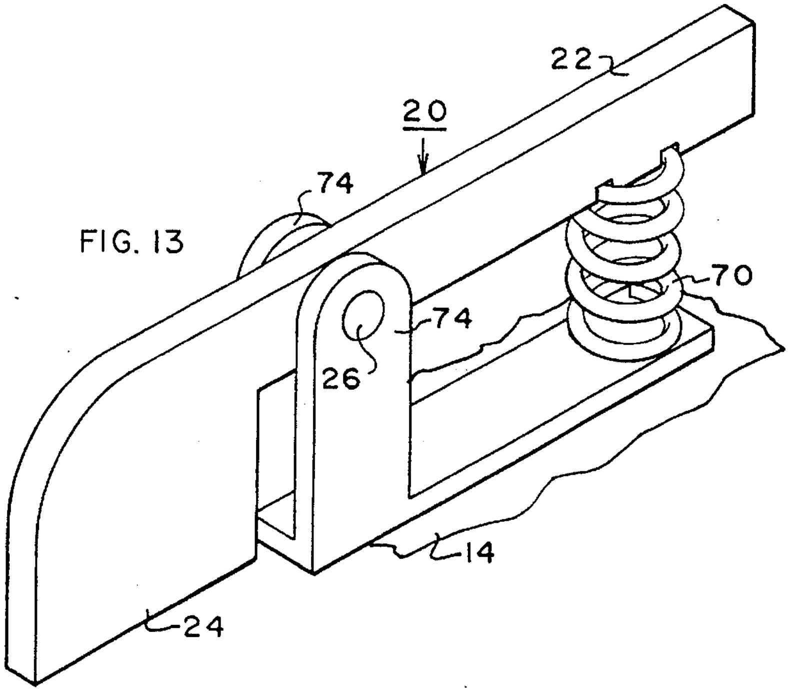
FIG. 13 is a perspective view of a modified form of interference means.

FIG. 13 illustrates another embodiment of the interference means 20. In this embodiment, the lever 22 and the impact head 24 are of a slightly different configuration from corresponding parts in FIGS. 1–9. The lever is biased in a counter-clockwise direction by a compression spring 70 instead of the torsion spring (29) of FIGS. 1–9. The lever of FIG. 13 is pivotally supported by two spaced-apart tabs 74 suitably secured to the flop section 14 and a pivot pin 26 which extends between the tabs and freely through a hole in the lever 22 to form a bearing for the lever. The FIG. 13 embodiment operates in substantially the same manner as the embodiment of FIGS. 1–9.

While FIGS. 1–3 show a flop section (14) which is normally inseparable from the main chute section (12), it is to be understood that the flop section could instead be a separable section (like the extension section 40 in the embodiment of FIGS. 10–11) that is hooked onto the flop section in the same manner as the extension section is hooked onto its adjacent section, as in the embodiment of FIGS. 10–11.

While I have shown and described particular embodiments of my invention, it will be apparent to those skilled in the art that various changes and modifications may be made without departing from the invention in its broader aspects; and I, therefore, intend herein to cover all such changes and modifications as fall within the true spirit and scope of my invention.

What I claim as new is:

1. A chute comprising a first section having an outer end portion, a second section having an inner end portion, and means pivotally connecting said inner end portion of the second section to said outer end portion of the first section in a manner that allows the second section to be pivoted from a folded position with respect to said first section into a position of alignment with said first section, releasable interference means for blocking said second section from entering its position of alignment with said first section when said secondsection is pivoted from its folded position into an intermediate position near its position of alignment with said first section, said interference means comprising:

(a) a blocking member pivotally mounted on said inner end portion of the second section and comprising an impact head that is normally positioned in a blocking position between the outer end portion of said first section and the inner end portion of said second section when the second section enters said intermediate position, (b) spring means biasing said impact head into said blocking position, and in which:

(c) the blocking member further comprises an actuating portion through which releasing force can be applied to said blocking member to move the impact head out of said blocking position, and (d) movement of said impact head out of said blocking position allows the second chute section to pivot into its position of alignment with said first chute section.

2. A chute as defined in claim 1 wherein:

(a) means is provided on said first chute section for holding said impact head in a non-interfering position with respect to said chute sections when the second chute section has entered its position of alignment with respect to said first chute section, and (b) said spring means restores said blocking member to said blocking position when second chute section is pivoted a short distance out of its position of alignment toward its folded position.

3. A chute as defined in claim 1 and in which:

(a) said first chute section comprises a body portion of U-shaped transverse cross-section and a first flange on the exterior of said body portion near the outer end of said first chute section, (b) said second chute section comprises a body portion of U-shaped transverse cross-section and a second flange on the exterior of said body portion of the second section near the inner end of said second chute section, and (c) said impact head is positioned between and abuts said flanges when said second chute section enters said intermediate position upon approaching its aligned position with respect to said first chute section.

4. The chute of claim 3 in which:

(a) means on said first chute section holds said impact head in a non-interfering position with respect to said chute sections when the second chute section has entered its position of alignment with respect to said first chute section, and (b) said spring means restores said blocking member to said blocking position when said second chute section is pivoted a short distance out if its position of alignment toward its folded position.

5. The chute of claim 4 in which said means on said first chute section for holding said impact head in said non-interfering position comprises said first flange on said first chute section.

6. The chute of claim 1 in which:

(a) the outer end portion of said first chute section includes a stop against which said impact head abuts when the impact head is in its blocking position and said second chute section enters said intermediate position, and (b) said stop includes a recess into which the inner end of said second chute enters when said second chute section pivots into its position of alignment with said first chute section.

7. A chute as defined in claim 1 and in which:

(a) said first chute section comprises a body portion of U-shaped transverse cross-section and a first flange on the exterior of said body portion near the outer end of said first chute section, (b) said second chute section comprises a body portion of U-shaped transverse cross-section and a second flange on the exterior of said body portion of the second section near the inner end of said second chute section, and (c)said first chute section further comprises a stop mounted on said first flange and projecting toward the outer end of said first chute section and defining an axially-outward facing surface against which said impact head abuts when the impact head is in its blocking position and said second chute section enters said intermediate position, and (d) a recess is present between said axially-outward facing surface of the stop and the outer surface of the body portion of said first chute section into which the inner end of second chute section enters when said second chute section pivots into its position of alignment with said first chute section.

8. The chute of claim 1 in which:

(a) said blocking member is mounted for angular motion in a predetermined operating plane with respect to said second section, and sidewards torque on said blocking member imposes forces on said blocking member tending to angularly displace said predetermined operating plane, (b) the outer portion of said first chute section includes a first stop having a surface against which said impact head abuts when the impact head is in its blocking position and said second chute section enters said intermediate position, (c) the inner portion of said second chute section includes a second stop having a surface against which said impact head abuts when the impact head is in its blocking position and said second chute section enters said intermediate position, (d) the impact head has a side face that is disposed at a first predetermined angle x with respect to said surface of said first stop when the impact head abuts said first stop surface, the angle x being measured at the contact point where abutment occurs between said impact head and said first stop surface, (d) said side face is disposed at a second predetermined angle y with respect to said surface of said second stop when the impact head abuts said second stop surface, the angle y being measured at the contact point where abutment occurs between said impact head and said second stop surface, and (e) angles x and y are substantially equal, thereby reducing the sidewards torque imposed on the blocking member when the impact head is abutted by said surfaces of said stops upon entry of said second section into said intermediate position.

9. The chute of claim 1 in which:

(a) said blocking member is mounted for angular motion in a predetermined operating plane with respect to said second section, and sidewards torque on said blocking member imposes forces on said blocking member tending to angularly displace said predetermined operating plane, (b) the outer portion of said first chute section includes a first stop having a surface against which said impact head abuts when the impact head is in its blocking position and said second chute section enters said intermediate position, (c) the inner portion of said second chute section includes a second stop having a surface against which said impact head abuts when the impact head is in its blocking position and said second chute section enters said intermediate position, and (d) the impact head is disposed at such angles with respect to the surfaces of said stops that it contacts when abutted by said stops that the sidewards torque on said blocking member is approximately zero when such abutment occurs.

10. A chute as defined in claim 1 and in which:

(a) said first chute section comprises a body portion and a first stop on the exterior of said body portion near the outer end of said first chute section, (b) said second chute section comprises a body portion and a second stop on the exterior of said body portion near the inner end of said second chute section, and (c) said impact head is positioned between and abuts said stops when said second chute section enters said intermediate position upon approaching its aligned position with respect to said first chute section.

11. A chute as defined in claim 10 and in which said second stop also acts as mounting structure on which said blocking member is pivotally mounted.

* * * * *